US011527801B2

(12) United States Patent
Lee et al.

(10) Patent No.: US 11,527,801 B2
(45) Date of Patent: Dec. 13, 2022

(54) SEPARATOR INCLUDING SUBSTRATE, FIRST LAYER WITH LITHIUM IRON PHOSPHATE PARTICLES, AND SECOND LAYER WITH ORGANIC PARTICLES, AND LITHIUM BATTERY INCLUDING THE SAME

(71) Applicant: SAMSUNG SDI CO., LTD., Yongin-si (KR)

(72) Inventors: Jungyoon Lee, Yongin-si (KR); Yongkyoung Kim, Yongin-si (KR); Yangseob Kim, Yongin-si (KR)

(73) Assignee: SAMSUNG SDI CO., LTD., Yongin-si (KR)

( * ) Notice: Subject to any disclaimer, the term of this patent is extended or adjusted under 35 U.S.C. 154(b) by 272 days.

(21) Appl. No.: 16/791,065

(22) Filed: Feb. 14, 2020

(65) Prior Publication Data
US 2020/0266415 A1     Aug. 20, 2020

(30) Foreign Application Priority Data

Feb. 18, 2019   (KR) ........................ 10-2019-0018825

(51) Int. Cl.
*H01M 50/449*   (2021.01)
*H01M 4/62*     (2006.01)
*H01M 10/0525*  (2010.01)
*H01M 50/446*   (2021.01)
*H01M 50/46*    (2021.01)

(52) U.S. Cl.
CPC ......... *H01M 50/449* (2021.01); *H01M 4/621* (2013.01); *H01M 10/0525* (2013.01); *H01M 50/446* (2021.01); *H01M 50/461* (2021.01)

(58) Field of Classification Search
CPC ............. H01M 50/449; H01M 50/461; H01M 50/446; H01M 4/621; H01M 10/0525
USPC .................................. 429/144, 251, 252, 254
See application file for complete search history.

(56) References Cited

U.S. PATENT DOCUMENTS

| 8,338,019 B2 | 12/2012 | Lee et al. |
| 9,799,917 B2 | 10/2017 | Amin-Sanayei et al. |
| 10,333,126 B2 | 6/2019 | Joo et al. |
| 10,541,401 B2 | 1/2020 | Lee et al. |
| 10,991,926 B2 | 4/2021 | Kwon et al. |
| 2011/0311856 A1* | 12/2011 | Matsui ............... H01M 50/489 429/144 |
| 2014/0272532 A1 | 9/2014 | Park et al. |

(Continued)

FOREIGN PATENT DOCUMENTS

| CN | 104051689 A | 9/2014 |
| CN | 104377328 A | 2/2015 |

(Continued)

OTHER PUBLICATIONS

Korean Office action dated Feb. 19, 2021 for corresponding Korean Application No. 10-2019-0018825.

(Continued)

*Primary Examiner* — Sean P Cullen
(74) *Attorney, Agent, or Firm* — Lee IP Law, P.C.

(57) ABSTRACT

A separator includes a substrate, a first layer on the substrate, the first layer including LiFePO$_4$ (LFP) particles, and a second layer on the substrate, the second layer including organic particles having a melting point in a range of about 100° C. to about 130° C.

17 Claims, 5 Drawing Sheets

(56) References Cited

U.S. PATENT DOCUMENTS

| | | | | |
|---|---|---|---|---|
| 2014/0322586 A1* | 10/2014 | Lee | ............... | H01M 50/449 |
| | | | | 429/144 |
| 2015/0050544 A1* | 2/2015 | Nam | ............... | H01M 50/431 |
| | | | | 429/144 |
| 2015/0140403 A1* | 5/2015 | Moon | ............... | H01M 50/411 |
| | | | | 429/144 |
| 2016/0329541 A1 | 11/2016 | Adams et al. | | |
| 2017/0117525 A1* | 4/2017 | Suzuki | ............... | B32B 27/14 |

FOREIGN PATENT DOCUMENTS

| | | |
|---|---|---|
| CN | 104659311 A | 5/2015 |
| JP | 2014-170661 A | 9/2014 |
| JP | 2014-527266 A | 10/2014 |
| JP | 2014527266 A * | 10/2014 |
| JP | 2016-100334 A | 5/2016 |
| KR | 10-2008-0101043 A | 11/2008 |
| KR | 10-2009-0051546 A | 5/2009 |
| KR | 10-2016-0039988 A | 4/2016 |
| KR | 10-2016-0041492 A | 4/2016 |
| KR | 10-2016-0118986 A | 10/2016 |
| KR | 10-2017-0004025 A | 1/2017 |
| KR | 10-2017-0055440 A | 5/2017 |
| KR | 10-2018-0127759 A | 11/2018 |
| WO | WO 2013-021299 A1 | 2/2013 |

OTHER PUBLICATIONS

Japanese Office action dated Mar. 15, 2021 for corresponding Japanese Application No. 2020-24410.
Chinese Office action dated Mar. 1, 2022 for corresponding Chinese Application No. 202010098683.4.
Chinese Office action dated Aug. 3, 2022 for corresponding Chinese Application No. 202010098683.4.

* cited by examiner

SEPARATOR INCLUDING SUBSTRATE, FIRST LAYER WITH LITHIUM IRON PHOSPHATE PARTICLES, AND SECOND LAYER WITH ORGANIC PARTICLES, AND LITHIUM BATTERY INCLUDING THE SAME

CROSS-REFERENCE TO RELATED APPLICATION

Korean Patent Application No. 10-2019-0018825, filed on Feb. 18, 2019, in the Korean Intellectual Property Office, and entitled: "Separator and Lithium Battery Including the Same," is incorporated by reference herein in its entirety.

BACKGROUND

1. Field

One or more embodiments relate to a separator and a lithium battery including the separator.

2. Description of the Related Art

In line with the miniaturization and high performance of various devices, the demand for small, light-weight batteries has increased. In addition, with respect to the field of electric vehicles, discharge capacity, energy density, and cycle characteristics of lithium batteries have become important factors. Therefore, a lithium battery having high discharge capacity per unit volume, high energy density, and excellent lifetime characteristics is required.

In a lithium battery, a separator is disposed between a cathode and an anode to prevent short-circuiting. An electrode assembly, which includes a cathode, an anode, and a separator between the cathode and the anode, may be wound into the form of a jelly-roll, and the jelly-roll-type electrode assembly may be roll-pressed to enhance adhesion between the separator and the cathode/anode in the electrode assembly.

SUMMARY

According to one or more embodiments, a separator may include a substrate, a first layer on one surface of the substrate, and a second layer, the first layer having LiFePO$_4$ (LFP) particles, and the second layer having organic particles with a melting point ($T_m$) in a range of about 100° C. to about 130° C.

According to one or more embodiments, a lithium battery may include a cathode, an anode, and a separator between the cathode and the anode, the separator having a substrate, a first layer on one surface of the substrate, and a second layer, the first layer having LiFePO$_4$ (LFP) particles, and the second layer having organic particles with a melting point ($T_m$) in a range of about 100° C. to about 130° C.

BRIEF DESCRIPTION OF THE DRAWINGS

Features will become apparent to those of skill in the art by describing in detail exemplary embodiments with reference to the attached drawings, in which.

DETAILED DESCRIPTION

Figure 1:
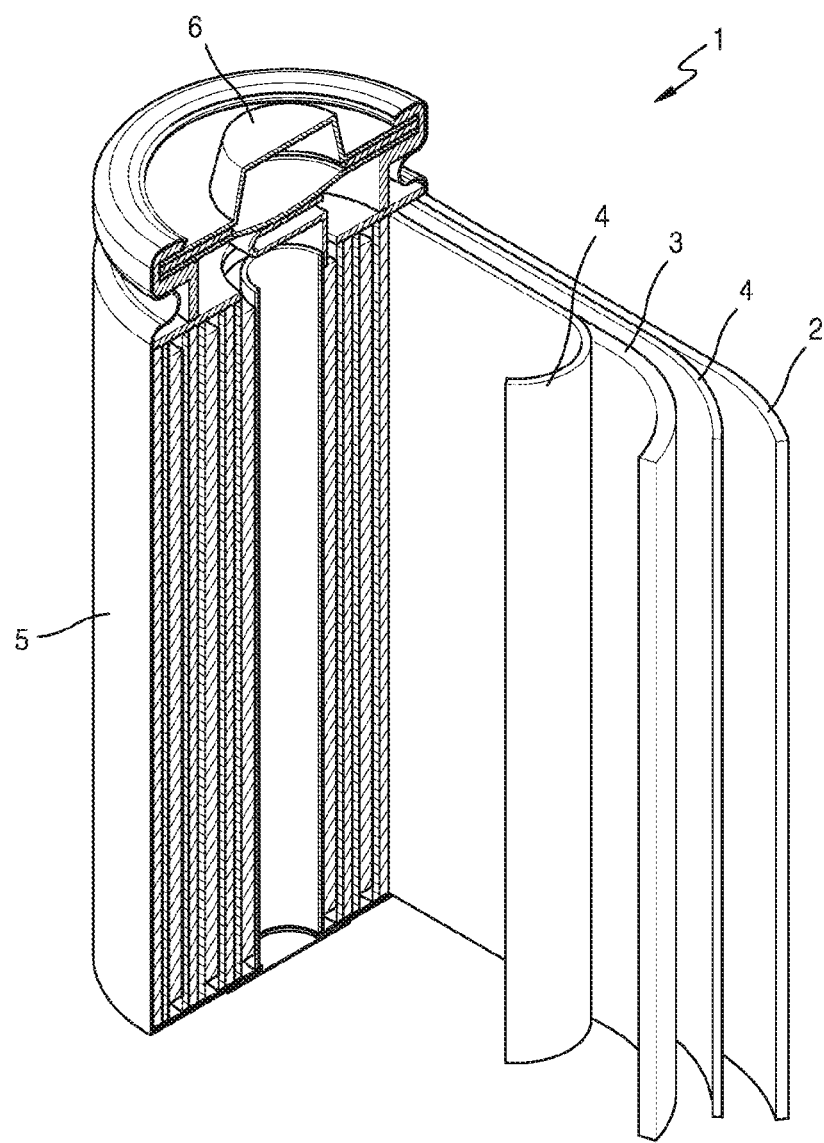
FIG. 1 illustrates a schematic view of a lithium battery according to an embodiment.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated for clarity of illustration. It will also be understood that when a layer or element is referred to as being "on" another layer or element, it can be directly on the other layer or substrate, or intervening layers may also be present. In addition, it will also be understood that when a layer is referred to as being "between" two layers, it can be the only layer between the two layers, or one or more intervening layers may also be present. Like reference numerals refer to like elements throughout.

Further, as used herein, the term "and/or" includes any and all combinations of one or more of the associated listed items. Expressions such as "at least one of," when preceding a list of elements, modify the entire list of elements and do not modify the individual elements of the list.

Hereinafter, a separator and a lithium battery including the separator according to one or more embodiments will be described in detail. According to an embodiment of the present disclosure, a separator may include a substrate, a first layer that is disposed on the substrate, and a second layer. The first layer may include LiFePO$_4$ (LFP) particles, and the second layer may include organic particles having a melting point ($T_m$) in a range of about 100° C. to about 130° C.

In general, when organic particles are included in a coating layer formed on a separator, the organic particles may melt during a penetration process and block short passes around a nail, thereby causing heat concentration and rapid increase in temperature. This, in turn, may deteriorate overall battery stability due to thermal runaway.

Figure 4:
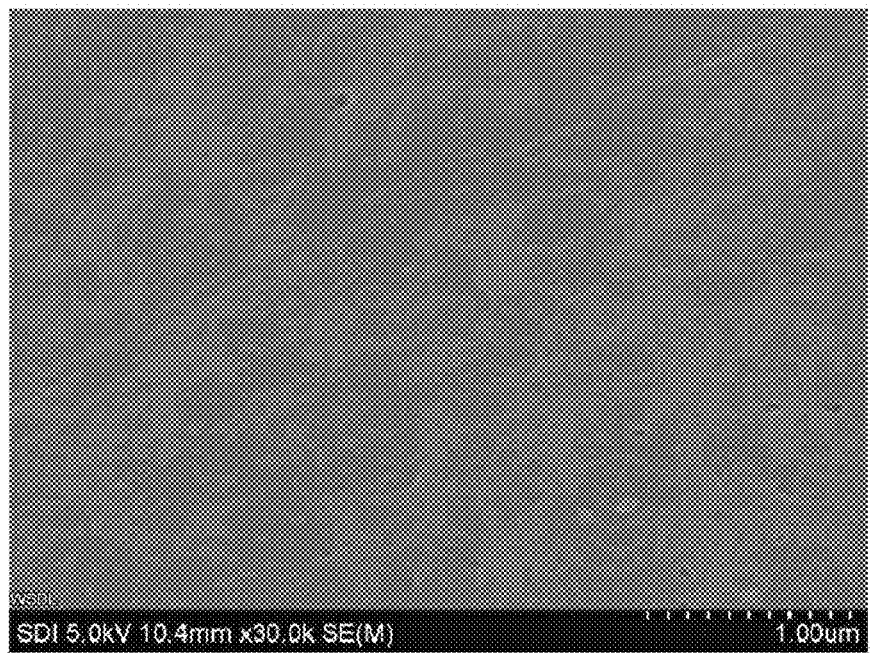
FIG. 4 illustrates an SEM image of a second layer of the separator according to an embodiment.

In contrast, the separator according to an embodiment of the present disclosure simultaneously includes the first layer including LFP particles and the second layer including organic particles having a melting temperature ($T_m$) in a range of about 100° C. to about 130° C. Thus, the separator may have high thermal stability and penetration stability, and may suppress side reactions with an electrolyte. That is, since the organic particles melt at a temperature of about 100° C. to about 130° C., the melted organic particles block pores of the separator, e.g., FIG. 4, thereby suppressing migration of current, which may result in improving thermal stability of the battery. Also, deterioration of life characteristics under normal operating conditions may be reduced.

Figure 2A:
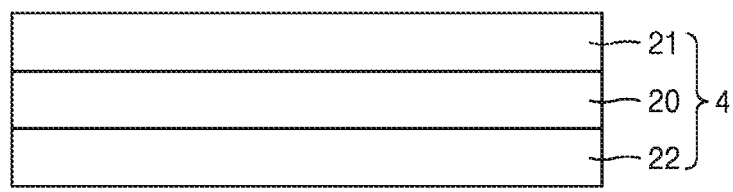
FIGS. 2A-2D illustrate schematic cross-sectional views of the separator according to embodiments.

FIG. 2A is a schematic cross-sectional view of a separator according to an embodiment. Referring to FIG. 2A, a separator 4 may include a substrate 20, a first layer 21, and a second layer 22. For example, as illustrated in FIG. 2A, the first and second layers 21 and 22 may be on opposite surfaces of the substrate 20. For example, as further illustrated in FIG. 2A, each of the first and second layers 21 and 22 may be continuous along an entirety of each of the respective opposite surfaces of the substrate 20.

Figure 2B:
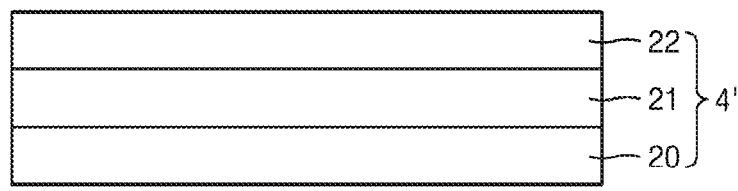

In another example, as illustrated in FIG. 2B, the first and second layers 21 and 22 may be on a same surface of the substrate 20 in a separator 4'. For example, as further illustrated in FIG. 2B, the first layer 21 may be between the substrate 20 and the second layer 22. For example, as further illustrated in FIG. 2B, the first and second layer 21 and 22 may be on a single surface of the substrate 20. In yet another example, the second layer 22 may be between the substrate 20 and the first layer 21.

Figure 2C:

In still another example, as illustrated in FIG. 2C, the first and second layers 21 and 22 may be stacked on each of the two opposite surfaces of the substrate 20 in a separator 4". Either of the first and second layers 21 and 22 may be directly on either of the two opposite surfaces of the substrate 20.

The first and second layers 21 and 22 of the separator 4 will now be described in more detail below. Referring to FIG. 2E, the first layer may include LFP particles 13. It is noted that FIG. 2E illustrates only the LFP particles 13 in the first layer of the separator on the cathode 10, for convenience, while other elements of the separator are omitted for clarity.

Referring to FIG. 2E, by including LPF particles 13, the separator intensively receives or provides lithium ions $Li^+$ from a cathode 10, which includes a cathode plate 11 and a cathode active material 12, at the end of discharging and in the beginning of charging of a battery. Thus, imbalance of lithium ion $Li^+$ concentrations in an electrolyte during charging and discharging of the battery and inhomogeneity of electrochemical reactions thus resulted may be resolved. During actual penetration of the separator, the concentration of currents may be minimized, and thus a rapid increase in temperature and heat output may be delayed. Further, by disposing the first layer including the LFP particles 13 on the substrate, reaction sites may decrease due to an interface formed between the first layer and the substrate, and thus electrolyte side reactions and the resulting gas and metal release or the like may decrease.

In one embodiment, as discussed previously with reference to FIG. 2A, the first layer 21 may be disposed on one surface of the substrate 20, and the second layer 22 may be disposed on the other surface of the substrate 20 opposite the one surface on which the first layer 21 is disposed. That is, the first layer 21 may be disposed on one surface of the substrate 20, and the second layer 22 may be disposed on the other surface that faces opposite the one surface of the substrate 20.

In another embodiment, as discussed previously with reference to FIG. 2C, both the first layer 21 and the second layer 22 may be disposed on one surface and the other surface opposite the one surface of the substrate 20. For example, the first layer 21 may be disposed on one surface of the substrate 20, where the second layer 22 may be disposed on the first layer 21, and the first layer 21 may be disposed on the other surface of the substrate 20, where the second layer 22 may be disposed on the first layer 21. In some embodiments, the second layer 22 may be disposed on one surface of the substrate, where the first layer 21 may be disposed on the second layer 22, and the second layer 22 may be disposed on the other surface of the substrate 20, where the first layer 21 may be disposed on the second layer 22. In some embodiments, the first layer 21 may be disposed on one surface of the substrate 20, where the second layer 22 may be disposed on the first layer 21, and the second layer 22 may be disposed on the other surface of the substrate 20, where the first layer 21 may be disposed on the second layer 22.

In another embodiment, as discussed previously with reference to FIG. 2B, the first layer 21 and the second layer 22 may be disposed on only one surface of the substrate 20. That is, the first layer 21 and the second layer 22 may be only disposed on one surface of the substrate 20, and the first layer 21 and the second layer 22 may not be disposed on the other surface of the substrate 20. For example, as illustrated in FIG. 2B, the first layer 21 may be disposed on one surface of the substrate 20, and the second layer 22 may be disposed on the first layer 21. In another example, the second layer 22 may be disposed on one surface of the substrate 20, and the first layer 21 may be disposed on the second layer 22.

In one embodiment, a porosity between the LFP particles 13 in the first layer 21 may be in a range of about 30% to about 80%, e.g., about 30% to about 50%. When the porosity between the LFP particles 13 is lower than about 30%, a size of a pathway through which lithium ion $Li^+$ is about to pass is too small, e.g., spaces between the LPF particles 13 are too small, thereby decrease of physical resistance due to introduction of the first layer 21 with the LFP particles 13 may not be achieved. When the porosity between the LFP particles 13 is greater than about 80%, a ratio of the included LFP particles 13 based on the total surface area of the separator 4 is too low, e.g., spaces between the LPF particles 13 are too large, thereby failing to provide sufficient penetration stability.

In one embodiment, the first layer 21 may further include a first binder. For example, the first binder may be a substrate adhesion binder.

For example, the LFP particles 13 and the first binder in the first layer 21 may be mixed at a weight ratio in a range of about 2:8 to about 8:2. For example, the first binder may be located in the pores between the LFP particles 13. When the first binder is located in the pores as described above, a certain level of permeability may be secured while minimizing a thickness of the first layer 21 formed on the separator 4.

For example, the first binder may be at least one of carboxyl methyl cellulose (CMC), polyvinylidene fluoride-co-hexafluoropropylene, polyvinylidene fluoride-co-trichloroethylene, polymethylmethacrylate, polybutylacrylate, polyacrylonitrile, polyvinylpyrrolidone, polyvinylacetate, polyvinyl alcohol, polyethylene-co-vinyl acetate, polyethylene oxide, polyarylate, celluloseacetate, cellulose acetate butyrate, cellulose acetate propionate, cyanoethylpullulan, cyanoethylpolyvinylalcohol, cyanoethylcellulose, cyanoethylsucrose, and pullulan.

The second layer 22 in the separator 4 according to an embodiment may include organic particles having a melting point ($T_m$) in a range of about 100° C. to about 130° C. When the melting point of the organic particles is lower than about 100° C., the organic particles melt and block pores of the separator 4 due to sudden heat release and change in external environment, thereby degrading the output and performance of the battery. When the melting point of the organic particles is higher than about 130° C., melt down of the separator 4 may occur, and thus a shutdown effect caused by the organic particles may not be exhibited. Therefore, the organic particles may melt at a temperature similar to a melting point of the substrate 20 of the separator 4.

In one embodiment, the organic particles may be included in the second layer 22 at an amount of about 10% by weight (wt %) or greater based on the total weight of the second layer 22, e.g., the organic particles may be included in the second layer 22 at an amount in a range of about 10 wt % to about 70 wt % based on the total weight of the second layer 22. When the amount of the organic particles is lower than about 10 wt %, a shutdown effect caused by the organic particles may not be exhibited. When the amount of the organic particles is higher than about 70 wt %, poor coating of the organic particles on the substrate 20 of the separator 4 band particle pushing due to separator winding pressure may occur.

In an embodiment, the organic particles may include at least one of polypropylene (PP), polyethylene (PE), polystyrene (PS), polyvinylidene fluoride (PVDF), polymethylmethacrylate (PMMA), an acrylate-based compound, polyacrylonitrile (PAN), and an azodicarbonamide-based compound. In one embodiment, the organic particles may include at least one of particle-type particles, plate-type particles, flake-type particles, and a mixture thereof.

In one embodiment, the second layer 22 may further include at least one of a second binder and an inorganic material. For example, the second layer 22 may further include only the second binder. For example, the second layer 22 may further include only the inorganic material. For example, the second layer 22 may further include the second binder and the inorganic material.

In one embodiment, the second layer 22 may further include the second binder. For example, the second binder may be a high heat-resistant binder. For example, the second binder may be at least one of a sulfonate-based compound or a derivative thereof, an acrylamide-based compound or a derivative thereof, an acrylonitrile-based compound or a derivative thereof, a copolymer thereof, and a mixture thereof. For example, the copolymer may refer to a copolymer of at least any two of the above compounds", "the mixture may refer to a mixture of at least any two of the above compounds.

For example, the organic particles and the inorganic material in the second layer 22 may be mixed at a weight ratio in a range of about 2:8 to about 8:2. For example, the inorganic material may be inorganic particles having at least two different particle diameters or may be inorganic particles of one type. For example, the inorganic material may be a mixture of inorganic particles having at least two different particle diameters. That is, when the second layer 22 of the separator 4 includes inorganic particles having at least two different particle diameters, i.e., bimodal inorganic particles, inorganic particles having a small particle diameter may fill pores between inorganic particles having a large particle diameter, thereby efficiently performing a shutdown function of the separator 4 at high temperatures due to the inorganic particles. In this regard, life characteristics of the lithium battery may improve as well as thermal stability of the lithium battery.

In one embodiment, a thickness of the first layer 21 may be in a range of about 0.1 µm to about 5.0 µm. In another embodiment, a thickness of the second layer 22 may be in a range of about 0.1 µm to about 5.0 µm.

That is, the first layer 21 and the second layer 22 in the separator 4 according to an embodiment of the present disclosure may be formed in a thin layer. For example, thicknesses of the first layer 21 and the second layer 22 may each independently be in a range of about 0.5 µm to about 5.0 µm, e.g., about 0.5 µm to about 4.0 µm, about 1.0 µm to about 4.0 µm, about 2.0 µm to about 4.0 µm, about 2.0 µm to about 3.5 µm, about 3.0 µm to about 5.0 µm. When the thicknesses of the first layer 21 and the second layer 22 are in the ranges above, the separator 4 including the first layer 21 and the second layer 22 may provide improved adhesion and permeability. Moreover, a thickness of an electrode assembly may be minimized, thereby maximizing capacity per volume of the battery.

Figure 2D:
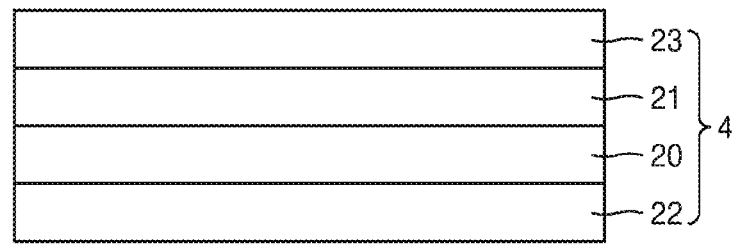
Figure 2E:
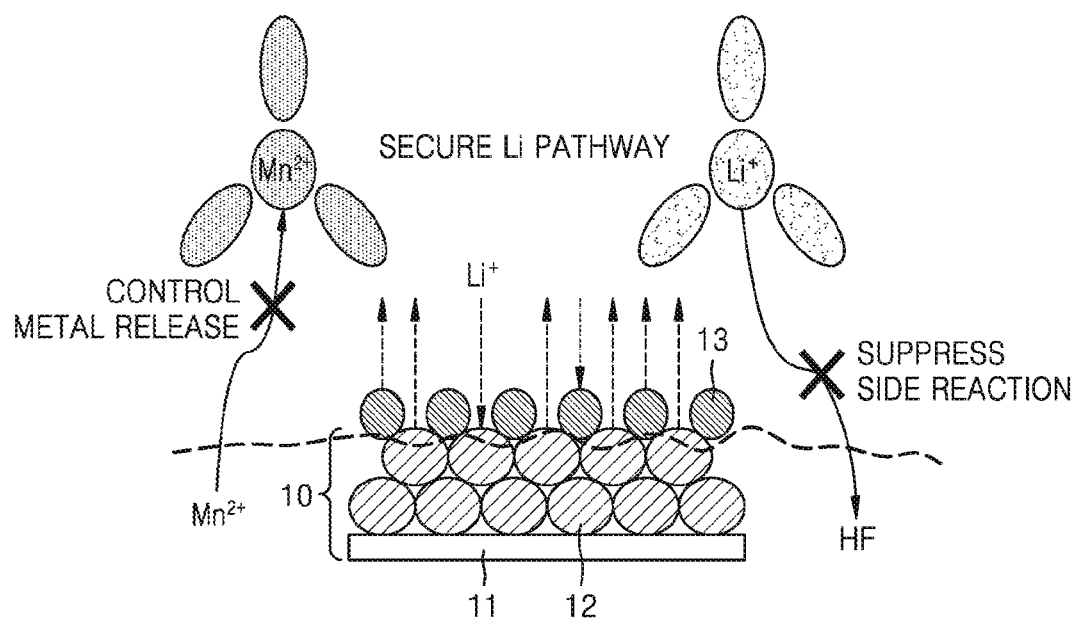
FIG. 2E illustrates a schematic view of a separator according to an embodiment.

In one embodiment, as illustrated in FIG. 2D, the separator 4 may further include an electrode adhesion layer 23 disposed on at least one layer of the first layer 21 and the second layer 22. For example, as illustrated in FIG. 2D, the first layer 21 may be between the substrate 20 and the electrode adhesion layer 23.

The electrode adhesion layer 23 may include a water-based binder existing in the form of particles after coating and drying and having a glass transition temperature ($T_g$) of about 50° C. or higher. For example, the water-based binder may include an acrylate group or a styrene group. For example, a thickness of the electrode adhesion layer 23 may be in a range of about 0.3 µm to about 0.5 µm.

In the separator 4 according to an embodiment of the present disclosure, the substrate 20 may be a porous substrate. The porous substrate may be a porous layer including polyolefin. Polyolefin has an excellent short-circuit preventing effect and may improve battery stability by a shutdown effect. For example, the porous substrate may be a layer that is formed of polyolefin, e.g., polyethylene, polypropylene, polybutene, or polyvinyl chloride, or a mixture or a copolymer thereof. Other examples of the porous layer may include a polyolefin-based resin, a porous layer prepared by weaving polyolefin-based fibers, a non-woven fabric including polyolefin, and an aggregate of insulating material particles. For example, the porous layer including polyolefin may include a binder solution having excellent coating property for preparing a coating layer on the substrate and may increase a capacity per unit volume by increasing an active material ratio in the battery by making a layer thickness of the separator thinner.

For example, polyolefin used as a material of a porous substrate may be a homopolymer, e.g., polyethylene, polypropylene, or a copolymer or a mixture thereof. Polyethylene may be low-density, medium-density, or high-density polyethylene, and high-density polyethylene may be used as polyethylene in terms of mechanical strength. Also, polyethylene may be prepared by mixing at least two different types of polyethylene to impart flexibility. Examples of a polymer catalyst used in preparation of polyethylene may include a Ziegler-Natta catalyst, a Phillips catalyst, or a metallocene catalyst. In terms of achieving both mechanical strength and high permeability, a weight average molecular weight of polyethylene may be in a range of about 100,000 to about 12,000,000, e.g., about 200,000 to about 3,000,000. Polypropylene may be, e.g., a homopolymer, a random copolymer, or a block copolymer, which may be used alone or may be used as a mixture of at least two selected therefrom. Examples of the polymer catalyst may include a Ziegler-Natta catalyst or a metallocene catalyst. Examples of tacticity may include isotactic, syndiotactic, or atactic, and inexpensive isotactic polypropylene may be used. Also, an additive, e.g., polyolefin and an anti-oxidant in addition to polyethylene or polypropylene, may be added to polyolefin.

For example, a porous substrate may include polyolefin, e.g., polyethylene or polypropylene. A multilayer having at least two layers may be used in the porous substrate, wherein the multilayer may be a mixed multilayer, e.g., a separator having a two layers of polyethylene and polypropylene, a separator having a three layers of polyethylene, polypropylene, and polyethylene, or a separator having a three layers of polypropylene, polyethylene, and polypropylene, but examples of the mixed multilayer are not limited thereto, and any material or composition available as a porous substrate in the art may be used.

For example, the porous substrate may include a diene-based polymer prepared by polymerizing a monomer composition including a diene-based monomer. The diene-based monomer may be a conjugated diene-based monomer or a non-conjugated diene-based monomer. Examples of the diene-based monomer may include at least one of the group consisting of 1,3-butadiene, isoprene, 2-chloro-1,3-butadiene, 2,3-dimethyl-1,3-butadiene, 2-ethyl-1,3-butadiene, 1,3-pentadiene, chloroprene, vinylpyridine, vinylnorbornene, dicyclopentadiene, and 1,4-hexadiene, but the examples are not limited thereto, and any material available as a diene-based monomer in the art may be used.

A thickness of the porous substrate in the separator 4 may be in a range of about 1 µm to about 100 µm, e.g., about 1 µm to about 30 µm, about 3 µm to about 20 µm about 3 µm to about 15 µm, or about 3 µm to about 12 µm. When a thickness of the porous substrate is less than about 1 µm, mechanical properties of the separator 4 may not be maintained. When a thickness of the porous substrate is greater than about 100 µm, an internal resistance of the lithium battery may increase.

A porosity of the porous substrate in the separator 4 may be in a range of about 5% to about 95%. When the porosity is less than about 5%, an internal resistance of the lithium battery may increase. When the porosity is greater than about 95%, mechanical properties of the porous substrate may not be maintained.

A pore diameter of the porous substrate in the separator 4 may be in a range of about 0.01 µm to about 50 µm, e.g., about 0.01 µm to about 20 µm or about 0.01 µm to about 10 µm. When the pore diameter of the porous substrate is less than about 0.01 µm, an internal resistance of the lithium battery may increase. When the pore diameter of the porous substrate is greater than about 50 µm, mechanical properties of the porous substrate may not be maintained.

For example, the first layer 21 or the second layer 22 may further include inorganic filler particles. The inorganic filler particles may be a metal oxide, a metalloid oxide, or a combination thereof. For example, the inorganic filler particles may be at least one of alumina ($Al_2O_3$), boehmite, $BaSO_4$, MgO, $Mg(OH)_2$, clay, silica ($SiO_2$), and $TiO_2$. The alumina or silica has small particle diameters and thus may be useful in preparing a dispersion. For example, the inorganic filler particles may be $Al_2O_3$, $SiO_2$, $TiO_2$, $SnO_2$, $CeO_2$, NiO, CaO, ZnO, MgO, $ZrO_2$, $Y_2O_3$, $SrTiO_3$, $BaTiO_3$, $MgF_2$, $Mg(OH)_2$, or a combination thereof.

The inorganic filler particles may be, e.g., in a sphere shape, a plate shape, or a fiber shape. The inorganic filler particles having a plate shape may be, e.g., alumina or boehmite. In this case, shrinkage of a surface area of the separator 4 at high temperatures may be further suppressed, a relatively high porosity may be secured, and characteristics of the lithium battery during a penetration test may improve.

When the inorganic filler particles have a plate shape or a fiber shape, an aspect ratio of the inorganic filler particles may be in a range of about 1:5 to about 1:100, e.g., about 1:10 to about 1:100, about 1:5 to about 1:50, or about 1:10 to about 1:50.

Figure 3:
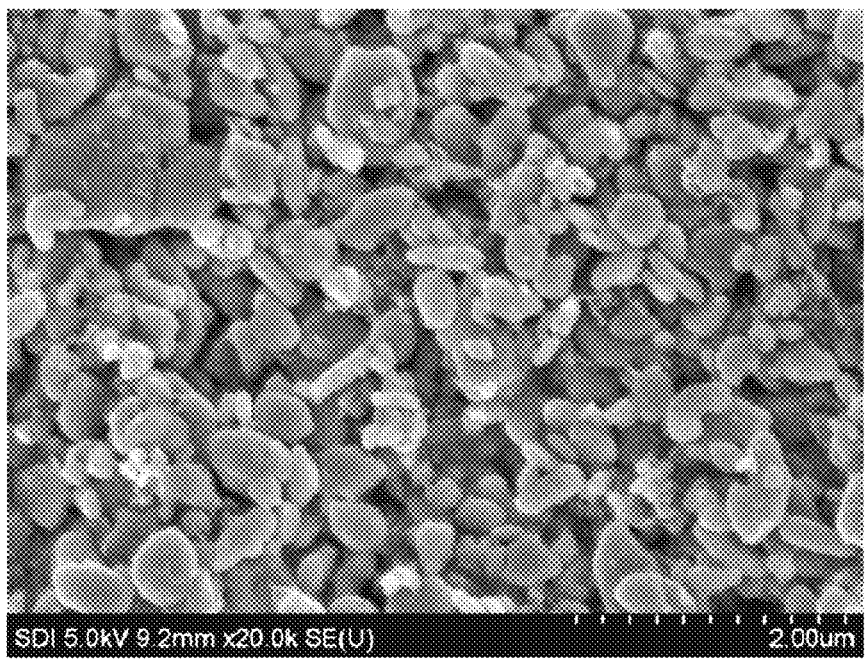
FIG. 3 illustrates a scanning electron microscope (SEM) image of a first layer of the separator according to an embodiment.

In a flat surface of the plate-shaped inorganic filler particles, a length ratio of the longest axis to the shortest axis may be in a range of about 1 to about 3, e.g., about 1 to about 2 or about 1. The aspect ratio and the length ratio of the longest axis to the shortest axis may be measured through a scanning electron microscope (SEM), e.g., FIG. 3. When the aspect ratio and the length ratio of the longest axis to the shortest axis is within these ranges, shrinkage of the separator 4 may be suppressed, a relatively improved porosity may be secured, and penetrating characteristics of the lithium battery may improve.

When the inorganic filler particles have a plate shape, an average angle of a flat surface of the inorganic filler particles to one surface of the porous substrate may be in a range of about 0 degree to about 30 degrees, e.g., about 0 degree. That is, the one surface of the porous substrate and the flat surface of the inorganic filler particles may be parallel to each other. For example, when the average angle of a flat surface of the inorganic filler particles to one surface of the porous substrate is within this range above, thermal shrinkage of the porous substrate may be efficiently prevented, and thus a separator having a reduced shrinkage may be provided.

Any convenient method of preparing the separator 4 may be used. For example, a slurry including the LFP particles 13, a first binder, the organic particles, a second binder, and an inorganic material may be prepared, the slurry may be applied on the substrate 20, and the substrate 20 may be dried and roll-pressed to prepare the separator 4.

Any convenient method of applying the slurry may be used. For example, the slurry may be applied by printing, compressing, press-fitting, roller coating, blade coating, brush coating, dip coating, spray coating, or lubrication coating.

According to another embodiment, a lithium battery may include the cathode 10, an anode, and the separator 4 disposed between the cathode 10 and the anode. When the lithium battery includes the separator 4 described above, thermal stability, especially penetrating and breakdown voltage (BDV) characteristics may improve, and short-circuits between electrodes at high temperatures may be suppressed. Further, when the lithium battery includes the separator 4, adhesion between the electrode (the cathode or the anode) and the separator increases, and thus volume change during charging/discharging of the lithium battery may be suppressed. Thus, deterioration of the lithium battery accompanied by the volume change of the lithium battery may be suppressed, and thus stability and life characteristics of the lithium battery may improve.

A 3-point bending strength of the lithium battery may be at least about 150 N. For example, a 3-point bending strength of the lithium battery may be in a range of about 150 N to about 200 N.

For example, the lithium battery may be prepared as follows. First, an anode active material, a conducting agent, a binder, and a solvent are mixed to prepare an anode active material composition. In some embodiments, the anode active material composition may be directly coated and dried on a metallic current collector to prepare an anode plate. In some embodiments, the anode active material composition may be cast on a separate support to form an anode active material film, which may then be separated from the support and laminated on a metallic current collector to prepare an anode plate. A type of the anode is not limited thereto and may be different from the type described above.

The anode active material may be a non-carbonaceous material. For example, the anode active material may include at least one of a metal alloyable with lithium, an alloy of a metal that is alloyable with lithium, and an oxide of a metal alloyable with lithium.

Examples of the metal alloyable with lithium may be Si, Sn, Al, Ge, Pb, Bi, Sb, a Si—Y' alloy (where Y' is an alkali metal, an alkali earth metal, Group XIII to XIV elements, a transition metal, a rare earth element, or a combination thereof, and Y' is not Si), and a Sn—Y' alloy (where Y' is an alkali metal, an alkali earth metal, Group XIII to XIV elements, a transition metal, a rare earth element, or a combination thereof, and Y' is not Sn). In some embodiments, Y' may be magnesium (Mg), calcium (Ca), strontium (Sr), barium (Ba), radium (Ra), scandium (Sc), yttrium (Y), titanium (Ti), zirconium (Zr), Hf, Rf, V, Nb, Ta, Db, chromium (Cr), molybdenum (Mo), tungsten (W), seaborgium (Sg), technetium (Tc), Rhenium (Re), Bohrium (Bh), iron (Fe), lead (Pb), ruthenium (Ru), osmium (Os), hassium (Hs), rhodium (Rh), iridium (Ir), palladium (Pd), platinum (Pt), copper (Cu), silver (Ag), gold (Au), zinc (Zn), cadmium (Cd), boron (B), aluminum (Al), gallium (Ga), tin (Sn), indium (In), germanium (Ge), phosphorus (P), arsenic (As), antimony (Sb), bismuth (Bi), sulfur (S), selenium (Se), tellurium (Te), polonium (Po), or a combination thereof.

Examples of the transition metal oxide may include a lithium titanium oxide, a vanadium oxide, and a lithium vanadium oxide. Examples of the non-transition metal oxide may include $SnO_2$ and $SiO_x$ (where $0<x<2$).

In particular, the anode active material may be at least one of Si, Sn, Pb, Ge, Al, $SiO_x$ (where $0<x \leq 2$), $SnO_y$ (where $0<y \leq 2$), $Li_4Ti_5O_{12}$, $TiO_2$, $LiTiO_3$, and $Li_2Ti_3O_7$, but the anode active material is not limited thereto, and any material available as a non-carbonaceous anode active material in the art may be used.

Also, a composite of the non-carbonaceous anode active material and a carbonaceous material may be used, and a carbonaceous anode active material may be further included in addition to the non-carbonaceous material.

Examples of the carbonaceous material are crystalline carbon, amorphous carbon, and mixtures thereof. Examples of the crystalline carbon are graphite, e.g., natural graphite or artificial graphite that are non-shaped or in plate, flake, spherical, or fibrous form, and examples of the amorphous carbon are soft carbon (carbon sintered at low temperatures), hard carbon, meso-phase pitch carbides, and sintered cokes.

Examples of the conducting agent are acetylene black, ketjen black, natural graphite, artificial graphite, carbon black, carbon fiber; metal powder or metal fiber of copper, nickel, aluminum, or silver; and a conductive material, such as a polyphenylene derivative, which may be used alone or as a mixture thereof, but embodiments are not limited thereto, and any material available as a conducting agent in the art may be used. Also, the crystalline carbonaceous material may be added as a conducting agent.

Examples of the binder are a vinylidene fluoride/hexafluoropropylene copolymer, polyvinylidene fluoride (PVDF), polyacrylonitrile, polymethylmethacrylate, polytetrafluoroethylene, mixtures thereof, and a styrene butadiene rubber polymer, but embodiments are not limited thereto, and any material available as a binder in the art may be used.

Examples of the solvent are N-methyl-pyrrolidone, acetone, and water, but embodiments are not limited thereto, and any material available as a solvent in the art may be used.

The amounts of the anode active material, the conducting agent, the binder, and the solvent may be in ranges that are commonly used in lithium batteries. At least one of the conducting agent, the binder, and the solvent may be omitted according to the use and the structure of the lithium battery.

A composition of the binder used in preparation of the anode may be the same with a binder composition included in the first layer and the second layer of the separator.

Next, a cathode active material, a conducting agent, a binder, and a solvent are mixed to prepare a cathode active material composition. In some embodiments, the cathode active material composition may be directly coated and dried on a metallic current collector to prepare a cathode plate. In some embodiments, the cathode active material composition may be cast on a separate support to form a cathode active material film, which may then be separated from the support and laminated on a metallic current collector to prepare a cathode plate.

The cathode active material may be at least one of a lithium cobalt oxide, a lithium nickel cobalt manganese oxide, a lithium nickel cobalt aluminum oxide, a lithium iron phosphate, and a lithium manganese oxide, but embodiments are not limited thereto, and any material available as a cathode active material in the art may be used.

In some embodiments, the cathode active material may be a compound represented by one of the following formulae: $Li_aA_{1-b}B'_bD'_2$ (where $0.90 \leq a \leq 1.8$, and $0 \leq b \leq 0.5$); $Li_aE_{1-b}B'_bO_{2-c}D'_c$ (where $0.90 \leq a \leq 1.8$, $0 \leq b \leq 0.5$, and $0 \leq c \leq 0.05$); $LiE_{2-b}B'_bO_{4-c}D'_c$ (where $0 \leq b \leq 0.5$, and $0 \leq c \leq 0.05$); $Li_aNi_{1-b-c}Co_bB'_cD'_\alpha$ (where $0.90 \leq a \leq 1.8$, $0 \leq b \leq 0.5$, $0 \leq c \leq 0.05$, and $0 \leq \alpha \leq 2$); $Li_aNi_{1-b-c}Co_bB'_cO_{2-\alpha}F'_\alpha$ (where $0.90 \leq a \leq 1.8$, $0 \leq b \leq 0.5$, $0 \leq c \leq 0.05$, and $0 < \alpha < 2$); $Li_aNi_{1-b-c}Co_bB'_cO_{2-\alpha}F'_2$ (where $0.90 \leq a \leq 1.8$, $0 \leq b \leq 0.5$, $0 \leq c \leq 0.05$, and $0 < \alpha < 2$); $Li_aNi_{1-b-c}Mn_bB'_cD'_\alpha$ (where $0.90 \leq a \leq 1.8$, $0 \leq b \leq 0.5$, $0 \leq c \leq 0.05$, and $0 < \alpha \leq 2$); $Li_aNi_{1-b-c}Mn_bB'_cO_{2-\alpha}F'_\alpha$ (where $0.90 \leq a \leq 1.8$, $0 \leq b \leq 0.5$, $0 \leq c \leq 0.05$, and $0 < \alpha < 2$); $Li_aNi_{1-b-c}Mn_bB'_cO_{2-\alpha}F'_2$ (where $0.90 \leq a \leq 1.8$, $0 \leq b \leq 0.5$, $0 \leq c \leq 0.05$, and $0 < \alpha < 2$); $Li_aNi_bE_cG_dO_2$ (where $0.90 \leq a \leq 1.8$, $0 \leq b \leq 0.9$, $0 \leq c \leq 0.5$, and $0.001 \leq d \leq 0.1$); $Li_aNi_bCo_cMn_dGeO_2$ (where $0.90 \leq a \leq 1.8$, $0 \leq b \leq 0.9$, $0 \leq c \leq 0.5$, $0 \leq d \leq 0.5$, and $0.001 \leq e \leq 0.1$); $Li_aNiG_bO_2$ (where $0.90 \leq a \leq 1.8$, and $0.001 \leq b \leq 0.1$); $Li_aCoG_bO_2$ (where $0.90 \leq a \leq 1.8$, and $0.001 \leq b \leq 0.1$); $Li_aMnG_bO_2$ (where $0.90 \leq a \leq 1.8$, and $0.001 \leq b \leq 0.1$); $Li_aMn_2G_bO_4$ (where $0.90 \leq a \leq 1.8$, and $0.001 \leq b \leq 0.1$); $QO_2$; $QS_2$; $LiQS_2$; $V_2O_5$; $LiV_2O_5$; $LiI'O_2$; $LiNiVO_4$; $Li_{(3-f)}J_2(PO_4)_3$ (where $0 \leq f \leq 2$); $Li_{(3-f)}Fe_2(PO_4)_3$ (where $0 \leq f \leq 2$); and $LiFePO_4$.

In the formulae above, A may be selected from nickel (Ni), cobalt (Co), manganese (Mn), and combinations thereof; B' may be selected from aluminum (Al), nickel (Ni), cobalt (Co), manganese (Mn), chromium (Cr), iron (Fe), magnesium (Mg), strontium (Sr), vanadium (V), a rare earth element, and combinations thereof; D' may be selected from oxygen (O), fluorine (F), sulfur (S), phosphorus (P), and combinations thereof; E may be selected from cobalt (Co), manganese (Mn), and combinations thereof; F' may be selected from fluorine (F), sulfur (S), phosphorus (P), and combinations thereof; G may be selected from aluminum (Al), chromium (Cr), manganese (Mn), iron (Fe), magnesium (Mg), lanthanum (La), cerium (Ce), strontium (Sr), vanadium (V), and combinations thereof; Q may be selected from titanium (Ti), molybdenum (Mo), manganese (Mn), and combinations thereof; I' may be selected from chromium (Cr), vanadium (V), iron (Fe), scandium (Sc), yttrium (Y), and combinations thereof; and J may be selected from vanadium (V), chromium (Cr), manganese (Mn), cobalt (Co), nickel (Ni), copper (Cu), and combinations thereof.

The compounds listed above as cathode active materials may have a surface coating layer (hereinafter, also referred to as "coating layer"). Alternatively, a mixture of a compound without a coating layer and a compound having a coating layer, the compounds being selected from the compounds listed above, may be used. In some embodiments, the coating layer may include a coating element compound selected from oxide, hydroxide, oxyhydroxide, oxycarbonate, and hydroxycarbonate of the coating element. In some embodiments, the compounds for the coating layer may be amorphous or crystalline. In some embodiments, the coating element for the coating layer may be magnesium (Mg), aluminum (Al), cobalt (Co), potassium (K), sodium (Na), calcium (Ca), silicon (Si), titanium (Ti), vanadium (V), tin (Sn), germanium (Ge), gallium (Ga), boron (B), arsenic (As), zirconium (Zr), or a mixture thereof. In some embodiments, the coating layer may be formed using any method that does not adversely affect the physical properties of the cathode active material when a compound of the coating element is used. For example, the coating layer may be formed using a spray coating method or a dipping method. The coating methods may be well understood by one of ordinary skill in the art, and thus a detailed description thereof will be omitted.

In some embodiments, the cathode active material may be $LiNiO_2$, $LiCoO_2$, $LiMn_xO_{2x}$ (where x is 1 or 2), $LiNi_{1-x}Mn_xO_2$ (where 0<x<1), $LiNi_{1-x-y}Co_xMn_yO_2$ (where 0≤x≤0.5, and 0≤y≤0.5), $LiFeO_2$, $V_2O_5$, TiS, or MoS.

In some embodiments, the conducting agent, the binder, and the solvent used for the cathode active material composition may be the same as those used for the anode active material composition. In some embodiments, a plasticizer may be further added to the cathode active material composition and/or to the anode active material composition to form pores in a corresponding electrode plate.

The amounts of the cathode active material, the conducting agent, the binder, and the solvent may be in ranges that are commonly used in lithium batteries. At least one of the conducting agent, the binder, and the solvent may be omitted according to the use and the structure of the lithium battery.

In some embodiments, a composition of the binder used in preparation of the cathode may be the same with a binder composition included in the first layer 21 and the second layer 22 of the separator 4.

Then, the separator 4 may be disposed between the cathode 10 and the anode. In an electrode assembly including the cathode 10, the separator 4, and the anode, the separator 4 disposed between the cathode 10 and the anode may include the first layer 21 and the second layer 22 disposed on one surface of the substrate 20 as described above. The first layer 21 may include $LiFePO_4$ (LFP) particles, and the second layer 22 may include organic particles having a melting point ($T_m$) in a range of about 100° C. to about 130° C.

The separator 4 may be separately prepared and then disposed between the cathode 10 and the anode. In some embodiments, the separator 4 may be prepared by rolling an electrode assembly including the cathode 10, the separator 4, and an anode wound in the form of a jelly-roll, accommodating the jelly-roll in a battery case or pouch, pre-charging the jelly-roll accommodated in the battery case or pouch while thermally softening the jelly-roll under pressure, heat-pressing the charged jelly-roll, cold-pressing the charged jelly-roll, and then performing a formation process that charges/discharges the charged jelly-roll under pressure and heat. Further details of the preparation method of a composite separator may be referred to the following description of the method of preparing a separator.

Thereafter, an electrolyte is prepared. The electrolyte may be in the state of liquid or gel. For example, the electrolyte may be an organic electrolyte solution. In some embodiments, the electrolyte may be in a solid phase. Examples of the electrolyte are boron oxide and lithium oxynitride, but embodiments are not limited thereto, and any material available as a solid electrolyte in the art may be used. In some embodiments, the solid electrolyte may be formed on the anode by, e.g., sputtering.

For example, the organic electrolyte solution may be prepared. In some embodiments, the organic electrolyte solution may be prepared by dissolving a lithium salt in an organic solvent.

The organic solvent may be any solvent available as an organic solvent in the art. In some embodiments, the organic solvent may be propylene carbonate, ethylene carbonate, fluoroethylene carbonate, butylene carbonate, dimethyl carbonate, diethyl carbonate, methylethyl carbonate, methylpropyl carbonate, ethylpropyl carbonate, methylisopropyl carbonate, dipropyl carbonate, dibutyl carbonate, benzonitrile, acetonitrile, tetrahydrofuran, 2-methyltetrahydrofuran, γ-butyrolactone, dioxolane, 4-methyldioxolane, N,N-dimethyl formamide, dimethyl acetamide, dimethylsulfoxide, dioxane, 1,2-dimethoxyethane, sulfolane, dichloroethane, chlorobenzene, nitrobenzene, diethylene glycol, dimethyl ether, or a mixture thereof.

In some embodiments, the lithium salt may be any material available as a lithium salt in the art. In some embodiments, the lithium salt may be $LiPF_6$, $LiBF_4$, $LiSbF_6$, $LiAsF_6$, $LiClO_4$, $LiCF_3SO_3$, $Li(CF_3SO_2)_2N$, $LiC_4F_9SO_3$, $LiAlO_2$, $LiAlCl_4$, $LiN(C_xF_{2x+1}SO_2)(C_yF_{2y+1}SO_2)$ (where x and y are each independently a natural number), LiCl, LiI, or a mixture thereof.

Referring to FIG. 1, a lithium battery 1 may include the cathode 3, an anode 2, and the separator 4. In some embodiments, the cathode 3, the anode 2, and the separator 4 may be wound or folded, and then sealed in a battery case 5. In some embodiments, the battery case 5 may be filled with an organic electrolytic solution and sealed with a cap assembly 6, thereby completing the manufacture of the lithium battery 1.

In some embodiments, the battery case 5 may be, e.g., a cylindrical type, a rectangular type, or a thin-film type. For example, the lithium battery 1 may be a thin-film type battery. In some embodiments, the lithium battery 1 may be a lithium ion battery. In some embodiments, the lithium battery 1 may be a lithium ion polymer battery.

In some embodiments, the separator 4 may be disposed between the cathode 3 and the anode 2 to form a battery assembly. In some embodiments, the battery assembly may be stacked in a bi-cell structure or may be rolled in the form of a jelly-roll and then impregnated with an electrolytic solution. In some embodiments, the resultant battery assembly may be put into a pouch and hermetically sealed, thereby completing the manufacture of a lithium ion polymer battery.

In some embodiments, a plurality of battery assemblies may be stacked to form a battery pack. The battery pack may be used in any device that requires high capacity and high output, e.g., in a laptop computer, a smart phone, or an electric vehicle.

The lithium battery may have improved high rate characteristics and lifetime characteristics. Thus, lithium battery may be used in an electric vehicle (EV), e.g., a hybrid vehicle such as a plug-in hybrid electric vehicle (PHEV).

Hereinafter, one or more embodiments will be described in detail with reference to the following examples and comparative examples. These examples are not intended to limit the purpose and scope of the one or more embodiments.

Preparation of Separator

Preparation Example 1

96 parts by weight of $LiFePO_4$ particles (LPF particles 13) and 4 parts by weight of CMC (first binder) were mixed to prepare a slurry for forming the first layer 21.

As organic particles, polyethylene (PE) having an average particle diameter (D50) of about 0.2 μm was prepared. 11 parts by weight of the organic particles, 4 parts by weight of a binder(high heat-resistant acryl-based compound), and 85 parts by weight of inorganic particles(boehmite) were mixed to prepare a slurry for forming the second layer 22.

The slurry for the first layer 21 was applied by gravure printing to a surface of a polyethylene porous substrate (i.e., the substrate 20) having a thickness of about 8.7 μm to form the first layer 21 having a thickness of about 3.0 μm on the surface of the porous substrate, and the slurry for the second layer 22 was applied by gravure printing to the other surface of the polyethylene porous substrate to form the second layer 22 having a thickness of about 3.0 μm on the surface of the porous substrate, thereby completing the preparation of the separator 4 having the first layer 21 and the second layer 22 on opposite surfaces of the substrate 20. A thickness of the separator 4 was about 14.7 μm.

Comparative Preparation Example 1

A separator was prepared in the same manner as in Preparation Example 1, except that the first layer and the second layer were not formed. That is, the comparative separator of Comparative Preparation example 1 included only the porous substrate as a separator.

Comparative Preparation Example 2

A separator was prepared in the same manner as in Preparation Example 1, except that the second layer was not formed. That is, the comparative separator of Comparative Preparation example 2 included only the porous substrate with a first layer.

Comparative Preparation Example 3

A separator was prepared in the same manner as in Preparation Example 1, except that 5 parts by weight of the organic particles, 4 parts by weight of the binder, and 91 parts by weight of the inorganic particles were mixed to prepare a slurry for forming a second layer.

Comparative Preparation Example 4

A separator was prepared in the same manner as in Comparative Preparation Example 3, except that the first layer was not formed.

Comparative Preparation Example 5

A separator was prepared in the same manner as in Preparation Example 1, except that the first layer was not formed. That is, the comparative separator of Comparative Preparation example 5 included only the porous substrate with a second layer.

Preparation of Lithium Battery

Example 1

(Preparation of Anode)

97 wt % of graphite particles (C1SR, available from Japan Carbon) having an average particle diameter of 25 μm, 1.5 wt % of a styrene-butadiene-rubber (SBR) binder (available from ZEON), and 1.5 wt % of carboxymethylcellulose (CMC, available from NIPPON A&L) were mixed, and then the mixture was added to distilled water and stirred by using a mechanical stirrer for 60 minutes to prepare an anode active material slurry. The slurry was coated on a copper current collector having a thickness of 10 μm by using a doctor blade, dried in a hot-air dryer at 100° C. for 0.5 hours, and then dried again in a vacuum at 120° C. for 4 hours, and the resultant was roll-pressed to prepare an anode plate.

(Preparation of Cathode)

97 wt % of $LiCoO_2$, 1.5 wt % of carbon black powder as a conducting agent, and 1.5 wt % of polyvinylidenefluoride (PVDF, available from SOLVAY) were mixed, and then the mixture was added to N-methyl-2-pyrrolidone as a solvent and stirred by using a mechanical stirrer for 30 minutes to prepare a cathode active material slurry. The slurry was coated on an aluminum current collector having a thickness of 20 μm by using a doctor blade, dried in a hot-air dryer at 100° C. for 0.5 hours, and then dried again in a vacuum at 120° C. for 4 hours, and the resultant was roll-pressed to prepare a cathode plate.

(Electrode Assembly Jelly-Roll)

The separator prepared in Preparation Example 1 was arranged between the cathode and anode plates prepared as above, and then the resulting structure was wound to prepare an electrode assembly in the form of a jelly-roll. The jelly-roll was accommodated in a pouch and an electrolytic solution was injected thereinto, and then the pouch was hermetically sealed.

As the electrolytic solution, a solution prepared by dissolving 1.3 M $LiPF_6$ in a mixed solvent of ethylene carbonate (EC)/methyl ethyl carbonate (EMC)/diethyl carbonate (DEC) in a volume ratio of 3:5:2 was used.

The jelly-roll accommodated in the pouch was subjected to thermal softening at a temperature of 70° C. for 1 hour while a pressure of 250 kgf/cm$^2$ was applied thereto and to pre-charging up to a state of charging (SOC) of 50%.

The jelly-roll was heat-pressed at a temperature of 85° C. for 180 seconds while a pressure of 200 kgf/cm$^2$ was applied thereto. In the heat-pressing process, as a phase of the binder was changed from a gel state to a sol state, adhesion between the separator and the cathode/anode was generated.

Subsequently, the jelly-roll was cold-pressed at a temperature of 22° C. to 23° C. for 90 seconds while a pressure of 200 kgf/cm$^2$ was applied thereto. In the cold-pressing process, a phase of the binder was changed from a sol state to a gel state.

Then, the pouch was degassed, and the lithium battery was charged at a constant current rate of 0.2 C at 45° C. for 1 hour while a pressure of 200 kgf/cm$^2$ was applied to the jelly-roll until the voltage reached 4.3 V, and charged at a constant voltage of 4.3 V until the current reached 0.05 C. Thereafter, cycles of discharging at a constant current of 0.2 C until the voltage reached 3.0 V were repeated five times, thereby performing a formation process.

Comparative Examples 1 to 5

Lithium batteries were prepared in the same manner as in Example 1, except that the separators prepared in Comparative Preparation Examples 1 to 5 were used, each respectively.

Evaluation Example: Measurement of Penetrating Characteristics

The jelly-roll was taken out of the pouch of each of the lithium batteries of Example 1 and Comparative Examples 1 to 5 having undergone the formation process, and the separator was separated from each assembly to evaluate penetration characteristics. The results are shown in Table 1 below. After performing a nail penetration test on each of the separators, a degree and a probability of abnormality occurrence were evaluated according to the observed phenomenon. When the result was L4-3 and L6, the separator was evaluated as having abnormality.

TABLE 1

|  | No abnormality (L3) | Flame occurrence after bending (L4-1) | Sparks (at least 2 seconds) (L4-3) | Rupture (L6) | Total | Probability of no abnormality occurrence (%) |
|---|---|---|---|---|---|---|
| Example 1 | 2 | 5 | 3 | — | 10 | 70% |
| Comparative Example 1 | — | — | — | 9 | 9 | 0% |
| Comparative Example 2 | 1 | — | 4 | 3 | 8 | 13% |
| Comparative Example 3 | 2 | — | 6 | 2 | 10 | 20% |
| Comparative Example 4 | — | — | — | 8 | 8 | 0% |
| Comparative Example 5 | 4 | — | 3 | 1 | 8 | 50% |

As shown in Table 1, the separator prepared in Example 1 exhibited significantly enhanced penetrating characteristics as compared to those of the separators prepared in Comparative Examples 1 to 5. That is, as described above, according to one or more embodiments, when a separator in a lithium battery includes the structure of Example 1, the separator may have improved penetration stability and enhanced adhesion to an electrode plate, and thus life characteristics and battery stability of the lithium battery may improve.

By way of summation and review, olefin-based polymers are widely used in the fabrication of separators for lithium batteries. Olefin-based polymers have excellent flexibility but have low strength when impregnated with an electrolytic solution, and short-circuiting may occur in batteries due to rapid thermal contraction at high temperatures of 100° C. or higher.

Therefore, attempts have been made to enhance strength and thermal resistance of separators by coating ceramic on a surface of a porous olefin-based polymer substrate. However, since adhesion between the ceramic-coated separator and a cathode/anode is low, a battery including such a separator may be easily deformed due to a rapid change in volume of the battery during charging and discharging.

Further, attempts have been made to increase adhesion between the ceramic-coated separator and the cathode/anode by adding a binder to the ceramic material. However, the separator including the binder added to the ceramic material exhibited an increase in internal resistance due to reduced porosity or easy deterioration of the lithium battery due to swelling of the binder in an electrolyte solution. In this regard, when a highly heat-resistant binder is used, thermal resistance of the separator improves and thus thermal shrinkage may be reduced, but the battery may still exhibit poor stability in high-temperature nail penetration test.

In contrast, according to embodiments, a separator that overcomes existing problems and has excellent penetration characteristics and thermal stability is provided. That is, embodiments provide a separator having an improved thermal stability and a lithium battery including the separator.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A separator, comprising:
   a substrate;
   a first layer directly on the substrate, the first layer including a first binder and LiFePO$_4$ (LFP) particles; and
   a second layer on the substrate, the second layer including:
   organic particles having a melting point in a range of about 100° C. to about 130° C.,
   a second binder, and
   an inorganic material, a weight by parts of the inorganic material being larger than a weight by parts of the organic particles, based on a total weight of the second layer,
   wherein the first layer with the LFP particles is an outermost layer of the separator, the first layer directly contacting a cathode.

2. The separator as claimed in claim 1, wherein the first layer is on a first surface of the substrate, and the second layer is on second surface of the substrate, the second surface being opposite the first surface.

3. The separator as claimed in claim 1, wherein a porosity between the LFP particles in the first layer is in a range of about 30% to about 80%.

4. The separator as claimed in claim 1, wherein the LFP particles and the first binder in the first layer are mixed at a weight ratio in a range of 2:8 to 8:2.

5. The separator as claimed in claim 1, wherein the first binder is at least one of carboxymethyl cellulose (CMC), polyvinylidene fluoride-co-hexafluoropropylene, polyvinylidene fluoride-co-trichloroethylene, polymethylmethacrylate, polybutylacrylate, polyacrylonitrile, polyvinylpyrrolidone, polyvinylacetate, polyvinyl alcohol, polyethylene-co-vinyl acetate, polyethylene oxide, polyarylate, celluloseacetate, cellulose acetate butyrate, cellulose acetate propionate, cyanoethylpullulan, cyanoethylpolyvinylalcohol, cyanoethylcellulose, cyanoethylsucrose, and pullulan.

6. The separator as claimed in claim 1, wherein a thickness of the first layer is in a range of about 0.1 μm to about 5.0 μm.

7. The separator as claimed in claim 1, wherein the melting point of the organic particles is the same as a melting point of the substrate.

8. The separator as claimed in claim 1, wherein the organic particles are included in the second layer at an amount of at least about 10% by weight (wt %) based on the total weight of the second layer.

9. The separator as claimed in claim 1, wherein the organic particles include at least one of polypropylene (PP), polyethylene (PE), polystyrene (PS), polyvinylidene fluoride (PVDF), polymethylmethacrylate (PMMA), an acrylate-based compound, polyacrylonitrile (PAN), and an azodicarbonamide-based compound.

10. The separator as claimed in claim 1, wherein the organic particles include particle-type particles, plate-type particles, flake-type particles, or a mixture thereof.

11. The separator as claimed in claim 1, wherein the organic particles and the inorganic material are mixed at a weight ratio in a range of at least 2:8.

12. The separator as claimed in claim 1, wherein the second binder is at least one of a sulfonate-based compound or a derivative thereof, an acrylamide-based compound or a derivative thereof, an acrylonitrile-based compound or a derivative thereof, a copolymer thereof, or a mixture thereof.

13. The separator as claimed in claim 1, wherein the inorganic material includes inorganic particles of at least two types having different particle diameters.

14. The separator as claimed in claim 1, wherein a thickness of the second layer is in a range of about 0.1 μm to about 5.0 μm.

15. The separator as claimed in claim 1, further comprising an electrode adhesion layer on the second layer.

16. The separator as claimed in claim 15, wherein a thickness of the electrode adhesion layer is in a range of about 0.3 μm to about 0.5 μm.

17. A lithium battery, comprising:
an anode; and
the separator as claimed in claim 1, the separator being between the cathode and the anode.

* * * * *